United States Patent [19]

Brookhart

[11] 4,145,683
[45] Mar. 20, 1979

[54] SINGLE TRACK AUDIO-DIGITAL RECORDER AND CIRCUIT FOR USE THEREIN HAVING ERROR CORRECTION

[75] Inventor: Marshall R. Brookhart, Newbury Park, Calif.

[73] Assignee: Minnesota Mining and Manufacturing Company, St. Paul, Minn.

[21] Appl. No.: 847,923

[22] Filed: Nov. 2, 1977

[51] Int. Cl.² ............................................. G06F 11/12
[52] U.S. Cl. .................... 340/146.1 F; 340/146.1 AL
[58] Field of Search ............... 340/146.1 F, 146.1 AL; 360/53

[56] References Cited

U.S. PATENT DOCUMENTS

| | | | |
|---|---|---|---|
| 3,774,154 | 11/1973 | Devore et al. | 340/146.1 F |
| 3,800,281 | 3/1974 | Devore et al. | 340/146.1 AL |
| 3,851,306 | 11/1974 | Patel | 340/146.1 AL |
| 3,876,978 | 4/1975 | Bossen et al. | 340/146.1 F |
| 3,913,068 | 10/1975 | Patel | 340/146.1 AL |

Primary Examiner—Charles E. Atkinson
Attorney, Agent, or Firm—Alexander, Cruzan; Donald M. Sell; William B. Barte

[57] ABSTRACT

A recorder for storage and retrieval of digitized audio signals on a single track of a suitable record medium is disclosed. The recorder includes networks for partitioning digitized audio signals into successive frames, each of which preferably contains a plurality of alternate data words and parity words, followed, at the end of each frame by an error check code word and a sync word. The parity words of a given frame are generated from data words of other frames sufficiently spatially remote from the given frame to minimize the probability that a single drop out or other defect in a record medium will, upon playback, cause the loss of data associated with both the given frame and the other frames. During playback, each frame is checked for errors, and if found, corrected data words are reconstructed from the parity words and data words of the other frames and are inserted in the data stream in place of the erroneous data words.

21 Claims, 5 Drawing Figures

SINGLE TRACK AUDIO-DIGITAL RECORDER AND CIRCUIT FOR USE THEREIN HAVING ERROR CORRECTION

BACKGROUND OF THE INVENTION (1) Field of the Invention

This invention relates to electronic equipment for processing analog signals such as those in the audio range into corresponding digital signals suitable for recording on a record medium such as magnetic recording tape, and particularly to related systems for correction of errors when such digitized signals are played back and reconverted into an output analog audio signal. (2) Description of the Prior Art Professional audio recording generally begins at the point where a number of tracks, such as 4, 8 or 16 tracks of analog audio signals are recorded onto a master tape, the master tape is then mixed with other masters to dub in other sounds and the mixed masters are further mixed into sub-master tapes having a single monaural track, two stereo tracks or four quadraphonic tracks. The sub-master tapes are then used as the basis for manufacture of both record discs and prerecorded tapes, such that any defects or deficiencies inherent in the analog signals are embodied in the subsequent generation master and sub-master recordings and become a part of all manufactured copies. In order to greatly reduce, if not completely eliminate many such deficiencies, professional audio recorders are now widely considering the adaptation of digital recorders such as are generally used in instrumentation and computer data processing fields for audio uses. In such recorders, as for example that depicted in U.S. Pat. No. 3,786,201 (Myers et al.), the analog signals are periodically sampled and a digital word is generated corresponding to each sample. Since the signal to tape interface affects only the fine structure digit carrying signal and not the numerical content per se, the integrity of the digitized audio signal is maintained and no degradation in the quality of the recorded sound occurs, even with repeated re-recording, mixing and the like. Typical decreases in the amplitude or pulse rise time, etc. of the digital pulses may be recovered by conventional signal processing techniques.

However, despite the inherent desirability of such digital audio recorders, general acceptance in the professional recording industry has not yet been achieved. It is believed that at least part of the reason for the lack of acceptance has been the propensity of errors in the digitized signal as may result from defects in the record medium such as the familiar drop-out problem in magnetic recording tape. Rather than merely causing a momentary loss of audio signal as in conventional analog audio recorders, the loss of a digital bit may, if it occurs at a most inopportune time, cause the signal to lose sync entirely such that all subsequent portions of the digital signal are meaningless. To avoid such total loss, it is conventional to group the digitized data words formed from a number of bits into blocks or frames, each of which is indexed by a sync word. Such systems still do not prevent the loss of data within a given frame, which loss will still result in an undesirable shift in the output level or other disturbing noises as well as the actual loss in the intended sounds.

In order to prevent the loss of computer or other data processing information, systems have been developed for detecting the presence of errors in a playback signal and for correcting errors so detected. Such schemes are not known for use in digital audio recorders per se. Typically, such data processing recorders enable error correction by providing redundant information which may then be recovered and played back in the event an error in a primary track is discerned. Most simply, such systems provide two (or more) totally redundant data tracks and record the same information on each of the tracks. Particularly, the data on the two tracks may be desirably spatially staggered along the length of the tape such that a single defect spanning both tracks will not cause the loss of the same portion of the signal. While such fully redundant systems are technically feasible, they obviously require twice as much record medium as would otherwise be needed. More sophisticated recorders have also been devised in which error correction codes are generated and recorded along with the digital data, such that when an error is detected, the correction codes are decoded to regenerate a corrected data portion corresponding to the erroneous data. Such schemes also generally utilize multiple tracks, in which one or more tracks may be exclusively devoted to storage of the error correcting code (ECC). See Patel, U.S. Pat. No. 3,745,528. In that patent, the error detection operation provides error pointers (pointing to an erroneous block of data) which are generated by determining the quality of the playback signal, i.e., overall waveforms, etc.

However, not all data or recording systems are amenable to multitrack recording, i.e., particularly to facilitate compatibility with previously accepted recorder systems, it is desirable to provide a single track digitized audio recorder in which an error correction operation is also employed. In U.S. Pat. No. 3,913,068 (Patel), a single track recorder is disclosed which utilizes a data format in which error check codes are included at the end of a block of data and in which external indicators are detected to initiate the need for error correction.

SUMMARY OF THE INVENTION

In contrast to the systems discussed above, the present invention is directed to a circuit for processing audio signals to be digitized and recorded on a single track of a suitable record medium. The circuit includes an error correction feature which enables the reconstruction of corrected data in frames in place of erroneous data without the need for externally generated error pointers. The circuit of the present invention is particularly adapted for use in an audio digital recorder in which both a record and a playback section are provided. The circuit includes means, such as an analog to digital converter, for converting an input analog audio signal into a corresponding digitized audio signal and an encoding means for partitioning the digitized audio signal into a serialized signal containing a succession of frames suitable for recording on the record medium. Each of the frames comprises a preselected number of data words, a preselected number of parity words, an error check word corresponding to the frame and a sync word defining the frame location. The encoding means includes means for generating the parity words of each frame by an exclusive combination of data words of at least two other frames which are preselected according to the expression $$P_K^N = D_{K+j}^{N+n} \oplus D_{K+k}^{N+m},$$

where $P_K^N$ is a given parity word located at segment K of frame N, $D_{K+j}^{N+n}$ is a given data word located at segment K+j of frame N+n, and $D_{K+k}^{N+m}$ is a given data word located at segment K+k of frame N+m. In these expressions, K, j, k, m and n are all integers, and m and n are not equal to each other or to zero. The thus encoded parity words enable each frame that is incorrectly played back to be detected. The circuit further enables correct data words of the incorrect frame to be reconstructed from the data words of at least one of the other preselected frames in combination with the parity words originally generated from the data words of the incorrect frame and the corrected data words inserted into a serialized playback signal in place of the data words of the incorrectly played back frame.

Preferably, the preselected frames are in turn selected to comprise data words spatially located at different predetermined intervals of time from the data words of the given frame such that the intervals of time are sufficiently long to provide a corresponding sufficient separation of the given frame from the preselected frames to minimize the probability that a single defect in a said record medium on which the digitized signal is to be recorded will cause the loss of signal corresponding to both the given frame and the preselected frames.

Preferably, the encoding means of the record section includes means for providing a succession of frames in which each frame contains a selected number of data words and parity words. Desirably, each parity word is divided into two components, each of which are positioned within a given frame immediately after a data word. Further, the parity word generating means preferably includes means for generating the parity words of a given frame from the data words in at least two predetermined spatial locations within different preselected frames, each of which is located a different multiple of N frames from the given frame.

Thus, for example, each frame desirably includes sixteen data words, each consisting of sixteen bits, and eight parity words, each consisting of sixteen bits. Each sixteen bit data word is indicative of the amplitude of the corresponding input analog audio signal during a sampling period selected to be less than that corresponding to the highest frequency to be recorded. I.e., an upper frequency of 20 KHz has a period of 50 $\mu$sec; accordingly, a sampling period of 20 $\mu$sec is desirably selected. Each sixteen bit parity word is divided into two eight bit portions, each of which is inserted following one data word.

The parity words are preferably generated from data words in two previous frames, one frame being located 15 frames previous and the other 30 frames previous to the frame being then formatted. Further, the specific parity word within the 16 data word-8 parity word sequence of each frame is preferably generated from the data word in the N+15 frame at the same relative position within the frame (i.e., j=0) and from the data word in the N+30 frame at one successive relative position (i.e., k=1). Generally, the encoding means includes a combination of shift registers and/or random access memories for temporarily storing the received data to enable construction of the parity words from successively received data words. The encoding means also includes means for generating error check word and sync word and means for assembling the respective words to complete each frame.

Analogously, the circuit desirably also includes a playback section including means for providing a digital playback signal corresponding to recorded data on a record medium, means for processing the digital playback signal to determine the presence of an erroneous frame, means for reconstructing a corrected data word in a frame and for inserting the corrected data word in place of the erroneous data word and means for converting the processed and corrected digital playback signal into a corresponding analog output audio signal. The means for determining the presence of an erroneous frame includes means such as shift registers and logic circuits for responding to a received playback signal to generate an error check code word corresponding to a received frame and for comparing the regenerated error check word with the corresponding error check code word received at the end of that frame to provide a frame error signal indicative of a said erroneous frame in the absence of a match between the two. The frame reconstruction means includes means for temporarily storing playback signals corresponding to each frame until signals corresponding to the preselected frames containing the parity and data words required for reconstruction of data words of said erroneous frame are received. When a frame error signal is received, corrected data words are reconstructed from the received parity and data words within said preselected frames and the reconstructed corrected data words are inserted in the proper spatial location within the processed digital playback signal.

Desirably, means including a FIFO memory and associated shift registers are also provided for correcting for "wow" and "flutter" and other time base irregularities in the received playback signal. Such time base correcting means may include means responsive to a fixed clock pulse signal from a playback control and time generator network to lock the received signals at that rate and servo means for controlling drive means for the record medium to ensure that the average periodicity of the sync words are the same as that of the fixed clock pulse signals. The error correction means also preferably includes shift registers and/or random access memories (RAM) as well as associated logic gates and the like which may be controlled by timing signals from the playback control and time generator network. Successive data words may thus be received and stored frame by frame in the RAM such when a frame error signal is received, a data latch network is activated. Data words from appropriate successive frames are then operated on together with appropriate parity words in a data reconstruction network such as a bank of exclusive OR gates. Reconstructed data words are then fed back to the RAM in the same relative location within the data stream as the original defective data words, and the data words corrected as necessary are coupled out, such as through a parallel to serial data converter to the digital to analog converting means.

The single track recorder with the error correction feature as herein described is particularly desirable in that it enables the expense of the record and playback heads to be minimized, and the record medium to be correspondingly narrower, thus facilitating handling the medium. In a preferred embodiment, a recorder having a one-inch tape moving at 45 ips has been found suitable for recording 32 parallel tracks in which the data in each track is protected by the error correction feature. Such a system is particularly useful in professional audio recorders where multiple track recording and mixing are desirable features.

DESCRIPTION OF THE PREFERRED EMBODIMENTS

Figure 1:
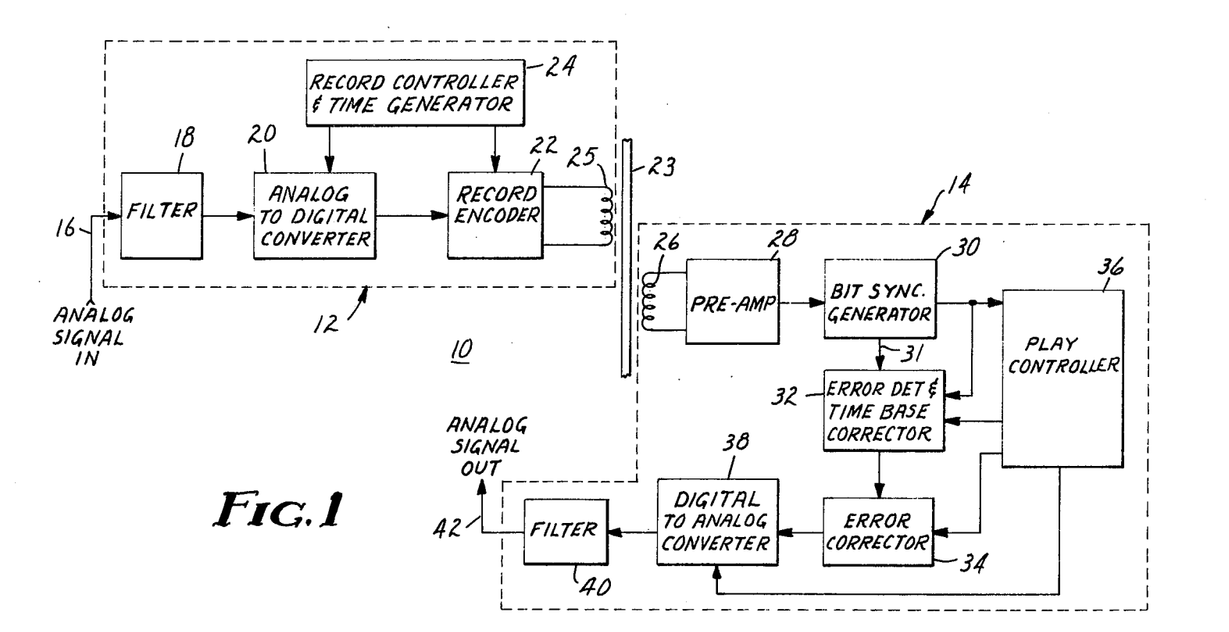
FIG. 1 is an overall block diagram of the audio-digital recorder of the present invention.

Referring first to FIG. 1, there is schematically shown an overall block diagram of a preferred embodiment for an audio-digital recorder having an error correction feature. As is there shown, the recorder 10 comprises a record section 12 and a playback section 14. An input analog audio signal received at terminals 16 is coupled through a low-pass filter 18 which removes all frequencies in excess of that desirably processed within the recorder. Typically, an upper cutoff frequency of 20 KHz is conveniently provided. A particularly desirable filter for processing input analog signals is a Type V87E 20 KHz low-pass filter manufactured by T. T. E., Inc., Los Angeles, California.

The thus filtered analog signals from the filter 18 are then coupled to an analog to digital converter 20 which converts the analog signal into a corresponding serial formatted digital equivalent. Such an analog to digital converter is conventional in the art and may desirably be purchased as a Model MP 8016 from Analegic Company, or modified as appropriate to provide a suitable number of digital bits corresponding to a desired dynamic range.

The serialized digital signal from the converter 20 is coupled to a record encoder 22. The encoder 22 is described in detail in conjunction with FIG. 3, and processes the serial digital signal so as to partition the serial digital bits into a succession of frames, each of which includes a plurality of data words, parity words, error correction word and sync word. In so doing, the serial input is converted to a parallel input which is then temporarily stored to enable subsequently received data words to be acted on in order to generate parity words corresponding to the subsequently received data words. These generated parity words are then formatted together with the temporarily stored data words to form a given frame.

The record controller and time generator 24 is coupled to both the A/D converter 20 and to the record encoder 22 to control the sampling time at which the A/D converter 20 generates digital bits corresponding to a given sampling time within the converter 20. In order to ensure reproduction of the highest frequency present in the analog signal, i.e., frequencies up to 20 KHz, it is essential that the sampling period be less than the period associated with such frequencies. Since a 20 KHz signal has a period associated therewith of 50 microseconds, a sampling period of 20 microseconds is desirably provided. The recorder controller and time generator 24 is further coupled to the record encoder 22 in order to provide appropriate timing signals therein to control the length of each of the data, parity, error correction and sync words within the formatted digital signal. Preferably, the data words and parity words generated therefrom are processed in parallel digital form. After the appropriate processing to generate the parity words is completed, the parity and data words are coupled through parallel to serial converters such as conventional shift registers to provide a serial output. Serial outputs corresponding to the data words, parity words and corresponding to serial formatted error code words and sync words are then coupled through a controller output switch to provide the respective data words in appropriate sequences. The thus formatted frames are preferably coupled through a delay modulation pulse generator network to provide an output signal suitable for recording on a suitable record medium utilizing a minimum bandwidth requirement. Such an output signal is coupled to a suitable record transducer such as a magnetic recording head 25.

The playback section 14 of the recorder 10 is adapted for playing back signals recorded on a record medium such as the magnetic recording tape 23, for detecting errors in the playback signal and for correcting such detected signals. The playback section 14 thus includes a playback transducer 26 such as a conventional magnetic playback head, the output of which is coupled to a preamplification and equalization circuit 28. This network desirably encompasses conventional circuits for interfacing a conventional magnetic pickup head with successive amplification and signal processing circuits. The circuit 28 provides an additional amplification stage for the received signal from the playback head 26 and provides equalization to compensate for amplitude and phase nonlinearities. The circuit 28 also includes a limiter for converting the flux transitions detected by the head into a digital delay modulated signal which generally corresponds to that recorded onto the record medium 23. The preamplification and equalization circuit 28 thus preferably may include an impedance matching transformer which couples the playback head 26 to an integrated circuit amplifier such as Type CA 3095 manufactured by RCA Company. The output from the integrated circuit amplifier may be coupled to a limiter, such as a zero crossing detector, which converts the quasi-digital signal as there amplified into a more readily processable, standardized delay modulation digital signal. The standardized signal is coupled to a bit-sync generator 30 which generates a clock signal corresponding to the rate of the data being reproduced at a nominal frequency of 1.25 MHz, and also generates a frame sync signal corresponding to a nominal frequency of 3.125 KHz, which signals are subsequently used for controlling the data processing operations. Further, the delay modulated digital signal is there processed through conventional decoding circuits to provide a non-return to zero (NRZ) digital formatted signal on lead 31.

The NRZ signal is coupled through lead 31 to the error detector and time base corrector 32, which, in response to control signals from the generator 30, generates the frame error signal in response to the detection of an erroneous frame. The corrector 32 is set forth in more detail in a block diagram of FIG. 4, and may be generally viewed as comprising two basic features, one dealing with error detection and one with time base correction. The error detection operation is effected through a cyclical redundancy code (CRC) check circuit. The CRC circuit generates a CRC check word from the reproduced signals and provides a frame error output signal indicative of the absence of a match between the generated CRC check word and the CRC code word received at the end of each frame. The time base correction portion of the corrector 32 includes input and output timing networks responsive to signals from the sync generator and to fixed clock signals from the play controller 36. Any deviation between the signals received from the sync generator 30 and the fixed clock signals are automatically corrected and any deviation such as that associated with "wow" or "flutter" from the playback mechanism are removed.

Figure 5:
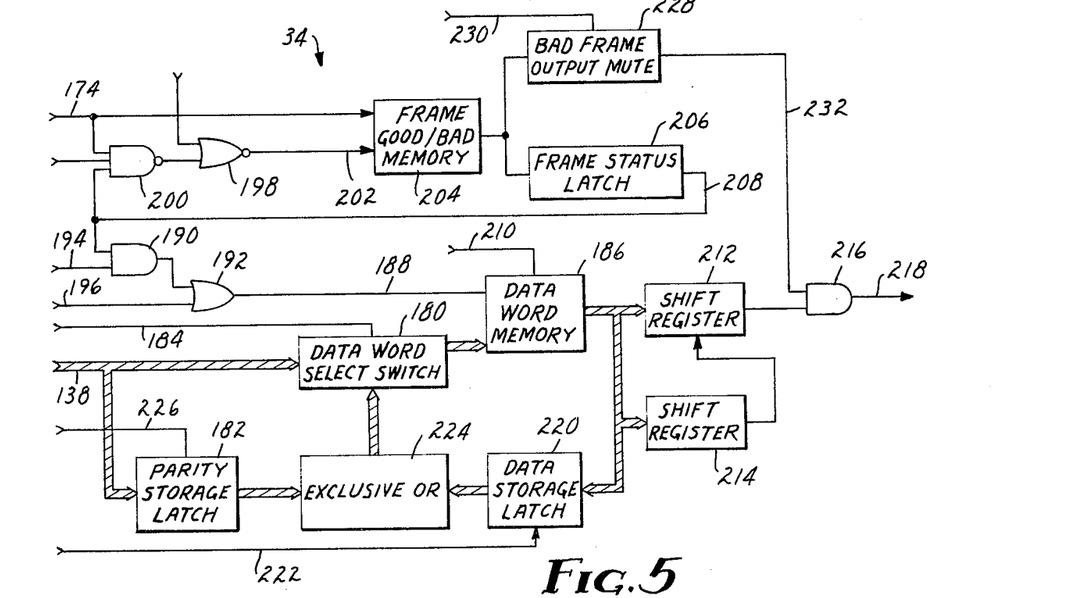
FIG. 5 is a block diagram of the error corrector within the playback section.

The output from the error detector and time base corrector 32 are coupled to the error corrector 34 as shown in more detail in the block diagram of FIG. 5. The error corrector 34 responds to that output in order to initiate error correction procedures. Data words and parity words received from the time base corrector 32 are split within the error corrector 34, and the data words are temporarily stored in a cyclically driven data word memory. Similarly, parity words as received are temporarily stored in a parity storage circuit. Upon appropriate instructions from the error detector 32 and the controller 36 indicative of the presence of erroneous words within a given frame, appropriate previously received data words are operated on together with appropriate parity words to reconstruct corrected data words. The reconstructed and corrected data words are then reinserted in the data word memory.

The successive frames, containing corrected data words as necessary, are coupled through appropriate shift registers to provide a corrected serialized output. This serial output is coupled to a digital to analog converter 38 such as a Type DAC 169-16 converter manufactured by Datel Systems, Inc. The resultant analog output signal is then desirably coupled through a low-pass filter 40 to remove any high frequency noises as may be present in the signal due to the digital processing operations. The thus processed analog audio playback signal is then coupled to an output terminal 42.

Figure 2:
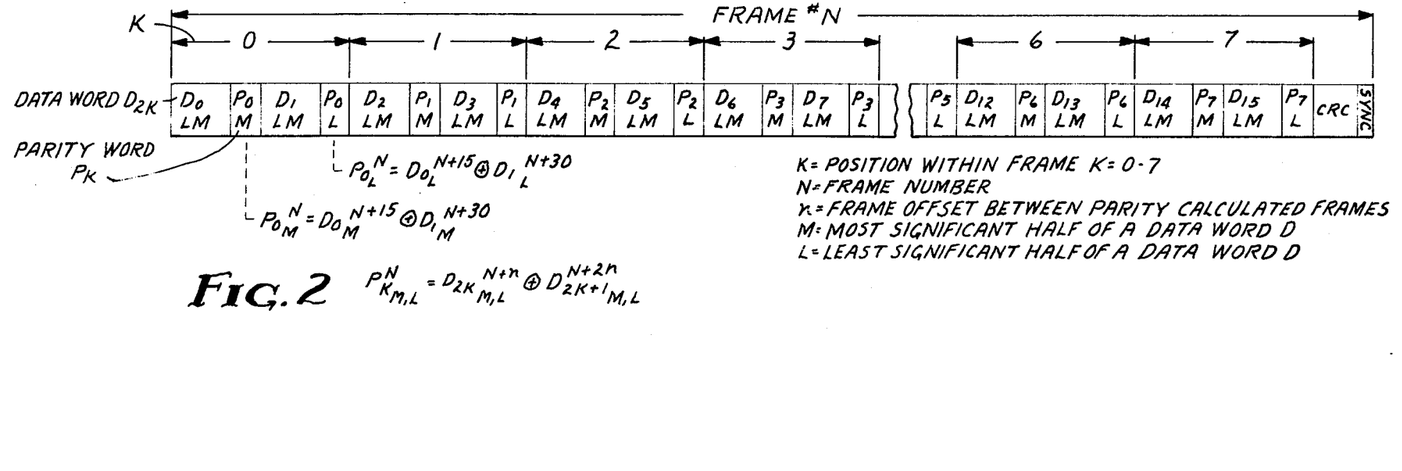
FIG. 2 shows the format of the data encoded according to the present invention and as recorded on a magnetic recording tape.

FIG. 2 shows a recording format for the audio information as presented in digital form together with appropriate codes enabling the error correction operations according to the present invention. As may there be seen, data within a given frame (N) is desirably formatted within a succession of postions (K) ranging from 0 through 7. Each of the positions K in turn includes two data words $D_0$ through $D_{15}$, and one parity word, each of which is divided into a most significant $P_{K_M}$ and least significant $P_{K_L}$ component. Each frame is completed by an error check code word, such as a cyclical redundancy code word and a synchronization code word. According to the format there shown, each of the data words $D_0$ through $D_{15}$ comprises a 16 digit analog of the intensity of a given sample of the input analog signal. As discussed hereinabove, each of the digital samples consisting of 16 digital bits is repeated every 20 microseconds, thereby providing a train of digital bits, the duration of each of which is 1.25 microseconds. Within the record encode network 22, the digitized data words are compressed into a framework wherein each bit has a duration of 0.8 microseconds, so as to provide time within each frame for the associated parity words, error check words, and synchronization words without expanding the time required for a given frame to be recorded. Thus, in the recorded format, each of the 16 data words $D_0$ through $D_{15}$ comprising 16 bits each, extends over a duration of 12.8 microseconds. The component of the parity words $P_{O_M}$ and $P_{O_L}$ through $P_{7_M}$ and $P_{7_L}$ each comprise 8 bits which also have a duration of 0.8 microseconds and thus extend 6.4 microseconds. Finally, the error check word in the form of a cyclical redundancy check, is generated from the preceding 16 data words and alternating parity word components and includes 12 bits, i.e., a duration of 9.6 miroseconds. Completing each frame is the synchronization word which consists of a 4 bit signal, i.e., a duration of 3.2 microseconds. Accordingly, each entire frame (N) has a total duration of 320 microseconds which is recorded in real time in synchronization with the 16 data word samples within the frame, each of which persists for 20 microseconds for a total sampled period of 320 microseconds.

As is further shown in FIG. 2, each of the parity words $P_{O_M}$ and $P_{O_L}$ through $P_{7_M}$ and $P_{7_L}$ within a frame N is generated from data words of frames which are spatially located a sufficient distance from the frame N that a single defect on a record medium will not cause the loss of both of the frame N and the frames from which the parity words of the frame N are generated. Thus, for example, in a preferred embodiment, the parity words $P_{K_M}$ and $P_{K_L}$ respectively, for each position K within the frame N will be generated from the data words $D_{O_M}$ and $D_{O_L}$ respectively of frame N+15 combined through an exclusive OR circuit, shown symbolically as $\oplus$, with the data words at the next position, i.e., $D_{1_M}$ and $D_{1_L}$ respectively, of frame N+30. Such relationships may be shown according to the following generalized expression:

$$P^N_{K_{M,L}} = D^{N+n}_{2K_{M,L}} \oplus D^{N+2n}_{(2K+1)_{M,L}}$$

where $P_K^N$ is a parity word at position K within frame N, $P_{K_M}$ referring to the parity words generated from the most significant half of the corresponding data words $D_{2K_M}$ and $D_{(2K+1)_M}$ and $P_{K_L}$ referring to the parity words generated from the least significant half of the data words $D_{2K_L}$ and $D_{(2K+1)_L}$; and where n is the offset between the frames of which the parity words of frame N are generated.

More specifically, the expressions for the parity words $P_{K_M}$ and $P_{K_L}$, i.e., corresponding to the most and least significant portions respectively of the data words $D_{2K}$ and $D_{2K+1}$ from which the parity words are generated are:

$$P^N_{K_M} = D^{N+n}_{2K_M} \oplus D^{N+2n}_{(2K+1)_M},$$

and $$P^N_{K_L} = D^{N+n}_{2K_1} \oplus D^{N+2n}_{(2K+1)_1}$$

In a preferred embodiment, N may be selected to be 15 such that for a given position K=0 of frame N the parity words $P_{O_M}$ and $P_{O_L}$ will be:

$$P^N_{O_M} = D^{N+15}_{O_M} \oplus D^{N+30}_{1_M}$$

and $$P^N_{O_L} = D^{N+15}_{O_L} \oplus D^{N+30}_{1_L}$$

Similarly, for position K=1 at frame N:

$$P_{1_M}^N = D_{2_M}^{N+15} \oplus D_{3_M}^{N+30}$$

and $$P_{1_L} = D_{2_L}^{N+15} \oplus D_{3_L}^{N+30}$$

And, for position K=2 at frame N:

$$P_{2_M}^N = D_{4_M}^{N+15} \oplus D_{5_M}^{N+30}$$

and $$P_{2_L}^N = D_{4_L}^{N+15} \oplus D_{5_L}^{N+30}$$

It may thus be seen that in the preferred embodiment of the present invention, an error correction scheme is set forth in which a ⅓ savings in required tape storage space is effected over that required for a fully redundant recording format by providing a two out of three redundant format. It is similarly within the scope of the present invention to further utilize encoding format as M out of N levels of redundancy. Thus, for example, a three out of four or four out of five scheme may similarly be adopted utilizing an encoding scheme similar to that depicted in FIG. 2. It is further within the scope of the present invention to provide formats similar to that shown in FIG. 2 but wherein parity information as well as error checking codes and synchronization words are differently spatially located within a given frame. For example, a synchronization code word, which locates a given frame, may be positioned within the frame as any of a variety of convenient locations. In FIG. 2, the sync word is shown to terminate a given frame N; however, the synchronization word may be positioned at any given location within the frame and may further be split apart so as to further delineate the end of any given position or word within the frame. Similarly, the error check (CRC) word and the parity words may be variously positioned within the frame or grouped together toward the terminal portion of a given frame.

Figure 3:
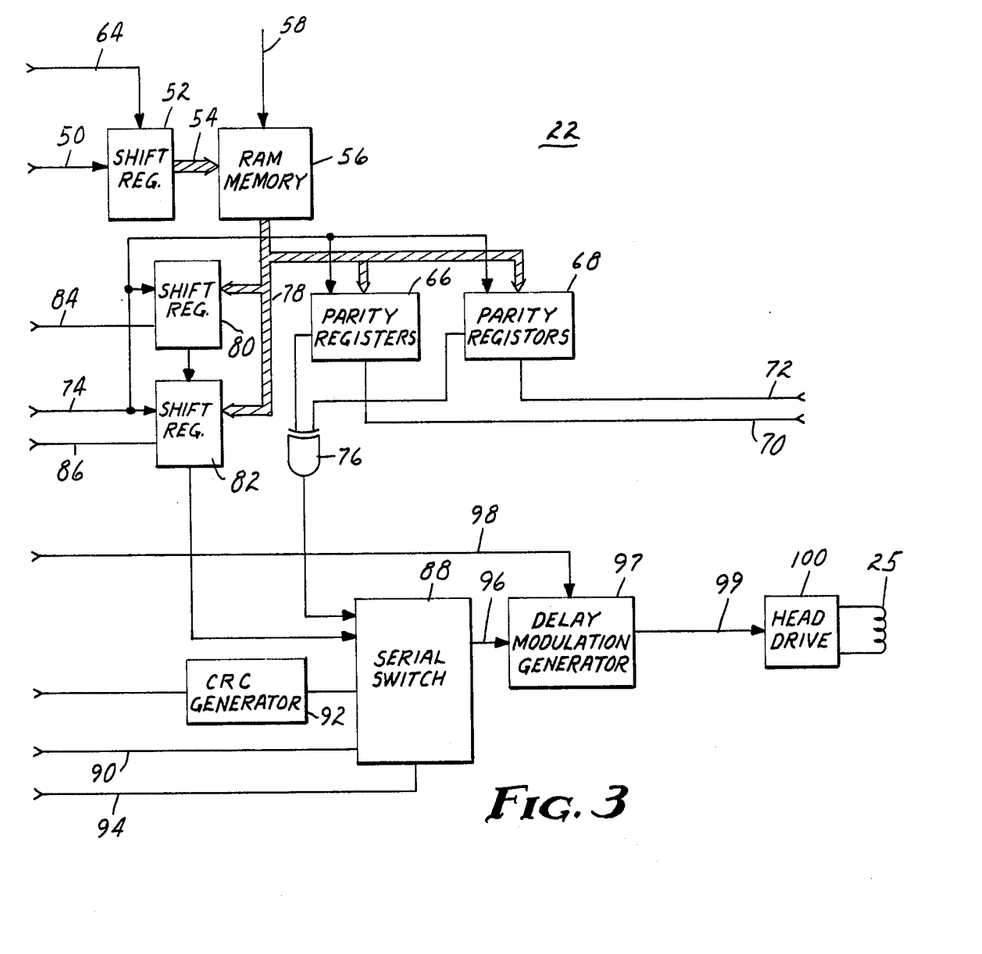
FIG. 3 is a block diagram of the record encoder within the record section of the recorder of the present invention.

The block diagram of FIG. 3 sets forth details of a preferred embodiment of the record encoder 22 of FIG. 1. As may there be seen, serialized digital data from the A/D converter 20 received on lead 50 is coupled to an 8 bit shift register 52, such as a Type 74LS164 integrated circuit module manufactured by Texas Instruments, Inc. (T.I.). The shift register 52 converts the serialized input digital information into a parallel output signal as denoted on the double leads 54. The parallel outputs are fed to a random access memory (RAM) 56, such as a bank of eight Type 2102 integrated circuit RAM memory elements, manufactured by N.E.C., which stores the data words of successive frames to enable the generation of parity words from the N+15th and N+30th frames. The RAM memory 56 provides a storage capacity of 1,024 bits per element, thus providing sufficient capacity to store the 30 frames, each of which contains 256 bits, i.e., a required capacity of 960 bits per register. The locations within the memory 56 in which the individual parallel signals are stored are controlled by outputs on lead 58 from the record controller 24. The controller 24 thus provides outputs to generate each address within the memory 56 at which the respective outputs from the shift register 52 are stored. The shift register 52 is also controlled by a signal on lead 64 from the controller 24 to enable the transfer of the serial data words inputed on lead 50 out of leads 54. In order to generate the parity words, the outputs from the RAM memory 56 are coupled to parity registers 66 and 68, which may preferably be IC circuits such as Type LS165, manufactured by T.I. The first of the parity registers 66 is controlled by signals from the record controller 24 on lead 70 to generate a parity word based on data words occurring N+15 frames later. I.e., data words located 15 × 256 bits or 3840 bits after a given data word is shifted into the register 66 by an appropriate command signal from the controller 24.

Similarly, the parity register 68 is controlled by timing signals on lead 72 from the record controller 24 to generate a parity word based on data words occurring in one successive position within the N+30th successive frame. Thus, data words located 30 × 272 (i.e., one frame of 256 bits plus one additional 16 bit data word) or 8,160 bits after a given data word, are shifted into the register 68 by an appropriate timing signal from the controller 24. The output from each of the parity registers 66 and 68 are then serially shifted out in response to a common clock control signal on lead 74, and are combined in the exclusive OR gate 76. Similarly, the undelayed data words within the memory 56 are outputed in parallel form on leads 78 to shift registers 80 and 82 in response to control signals on leads 84 and 86 from the controller 24 to thereby temporarily store the most significant and least significant portions of each data word. The serialized equivalent to the most significant and least significant portions of a given data word are then outputed from the shift registers 80 and 82 are coupled with the appropriate parity words from the exclusive OR gate 76 in a serial switch 88. Also coupled into the switch 88 are sync signals on lead 90 from the controller 24 as well as a CRC code word from the CRC generator 92. The CRC generator 92 is preferably an integrated circuit type such as 9404 manufactured by Fairchild Semiconductor Corp. Each of the respective four inputs into the switch 88 are appropriately gated out in response to control signals on lead 94 from the record controller 24. The serial switch 88 thus provides an output lead 96 a fully formatted serialized digital signal containing the appropriately sequenced data words and parity words within a given frame followed by the CRC check word and sync words. The serial signal on lead 96 is coupled to the delay modulation generator 97 together with timing signals on lead 98 from the controller 24 corresponding to a fundamental frequency (Fo) clock rate of 1.25 MHz, a 2Fo clock rate and a missing transition control signal. The thus processed digital signal from the generator 97, in delay modulation form, is coupled through lead 99 to a head driver circuit 100, which amplifies the digital signal, and applies the amplified signal to a record head 25, such that the thus processed delay modulated signal is recorded on a suitable record medium such as conventional magnetic recording tape.

Figure 4:
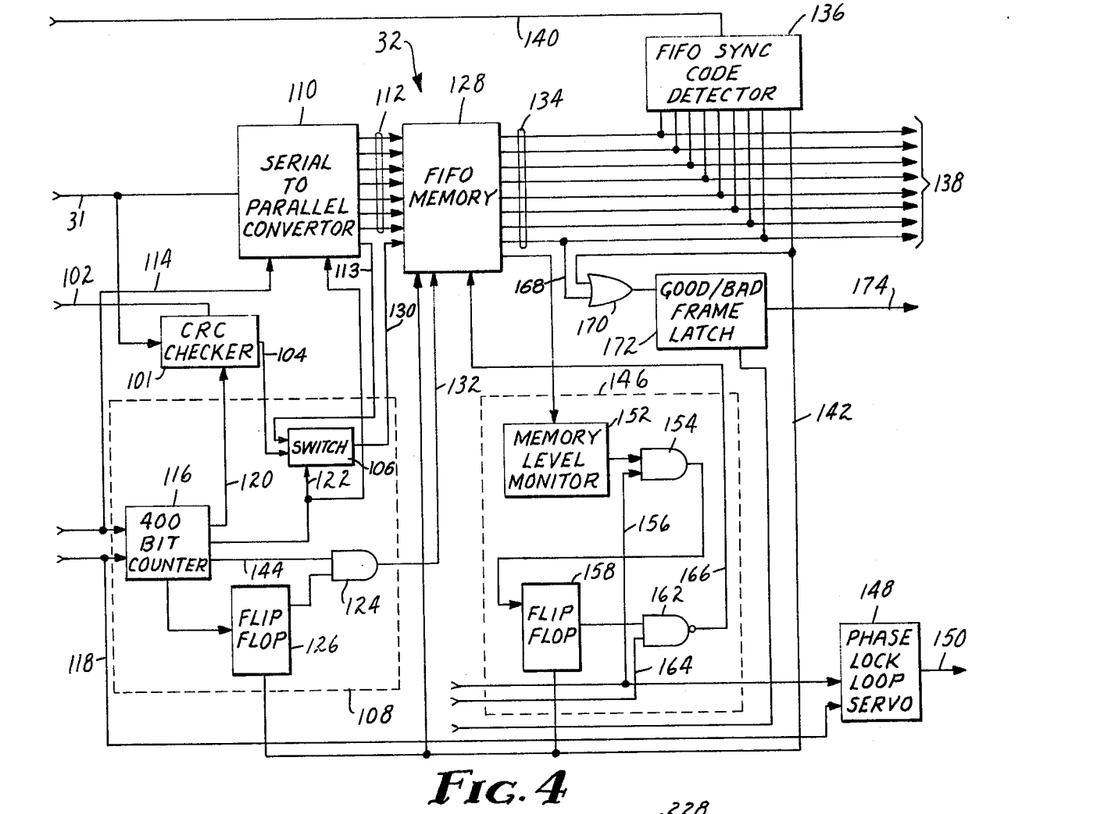
FIG. 4 is a block diagram of the error detection and time base corrector within the playback section of the recorder of the present invention.

Details of the manner in which signals are processed during playback to detect erroneous data and to provide correction of the time base of the retrieved signals are set forth in the block diagram of the error detector and time base corrector shown in FIG. 4. In this figure, the error detector and time base corrector 32 of FIG. 1 is shown to receive the serialized data from the bit sync generator 30 on lead 31. This input signal is coupled in parallel to both the time base corrector portion and to the error detection portion. The error detection portion includes a CRC check 101 which recodes the data words of each received frame and regenerates therefrom a corresponding CRC check word. That check word is then operated on in conjunction with the subsequently received CRC check word of that frame in a comparator network within the CRC checker 101. The synchronization of the respective comparison operations are controlled by a data clock signal on lead 102 from the play controller 36. In the absence of a match between the regenerated CRC check word and the subsequently received CRC check word, a frame error signal is provided on lead 104, which signal is coupled to a switch 106 within an input timing network shown generally as 108.

The data input on lead 31 is also coupled within the time base corrector portion to a serial to parallel converter 110 which converts the serial input data into a corresponding eight channel parallel output on leads 112. The converter 110 may conveniently be an integrated circuit such as Type LS164 manufactured by T.I. The sequencing of signals outputed from the convertor 110 are in turn controlled by tape clock signal on lead 114 from the bit sync generator 30 and from a 400 bit counter 116 within the input timing circuit 108. The counter 116 is in turn controlled by the tape clock signal on lead 114 and a frame sync signal on lead 118, and provides outputs on leads 120 and 122 corresponding to the end of each respective frame.

Seven of the eight parallel outputs from the convertor 110 are coupled on leads 112 to a first in-first out (FIFO) memory 128. The FIFO memory 128 preferably comprises a bank of six integrated FIFO IC chips such as Type 3341 manufactured by Fairchild Semiconductor Corp. The eighth parallel input to the FIFO memory 128 on lead 130 is from the switch 106, which selects between data on the eight output leads 113 of the convertor 110 and the frame error signal on lead 104 from the CRC error checker 101. The FIFO memory 128 is further controlled by a reset signal from the AND gate 124 on lead 132 to enable the data input signals to be temporarily stored and to be outputed on the parallel output leads 134 modified in time sequence as appropriate to provide a rigorously controlled time base.

The serial to parallel convertor 110 in conjunction with the switch 106 is adapted to replace the CRC check word (12 bits) and the sync word (4 bits) of the incoming data on lead 31 with a 16 bit FIFO sync code. This sync code is coupled via leads 112 together with the remaining data and parity words to the FIFO memory 128. One of the bits of the 16 bit FIFO sync code is coupled through the switch 106 back into the eighth input to the FIFO memory 128 via lead 130 in response to appropriate timing signals on lead 122. All eight parallel bits from the FIFO memory 128 are then coupled on leads 134, whence they are coupled to the FIFO sync code detector 136 as well as coupled to outputs 138 to the error corrector 34. The FIFO sync code detector 136 responds to the FIFO sync code on leads 134 and to timing signals from the play controller 36 on lead 140 to provide a feedback control signal on lead 142 in the event data outputed from the memory 128 is out of proper spatial position. If the data outputed from the FIFO memory 128 is thus out of sync with timing signals on lead 140, the data is automatically reset by signals on lead 142 inputed into the input enable flip-flop 126 which is then automatically reset through the AND gate 124 to control the rate at which data is processed in the FIFO memory 128, resets the FIFO memory 128 and resets the output enable flip-flop 158.

The 400 bit counter 116 is responsive to the tape clock pulse on lead 114 and to the frame sync signal on lead 118 to thus generate a control signal on lead 144 which is ⅛ of the rate at which the tape clock pulses occur. This signal is coupled together with the output from the enable data flip-flop 126 through the AND gate 124 and thence via lead 132 to enable the input to the FIFO memory.

The error detection and time base corrector 32 also includes an output timing network 146 which completes a feedback loop to a phase lock loop servo 148, which in turn provides outputs on lead 150 to control the driving speed of a record medium drive mechanism (not shown) to control the rate at which the data is fed in on lead 31. The network 146 includes a memory level monitor 152 which responds to the level of data in the FIFO memory 128, and provides an output signal when the memory is half full, i.e., when 75 bits are present at the input to the monitor 152. At that point, the output signal is coupled to the AND gate 154 together with an output frame sync signal from the play controller 36 on lead 156, which signal is also coupled to the phase lock loop servo 148, and which sets the output enable flip-flop 158. The output of flip-flop 158, when set, allows a crystal clock signal on lead 164 from the play controller 36 to pass through NAND gate 162 and thereby provides the fixed clock control signal on lead 166 to the FIFO memory 128. The output timing network 146 thus responds to the fixed clock signals and additional synchronization signals from the play controller 36 to control the rate at which signals are outputed from the FIFO memory 128 and to ensure that the output signals on lead 138 are provided in an absolute fixed time relationship.

The error detection and time base corrector 32 also includes means for generating the error frame signal. Such a signal is triggered by the eighth output lead 168 from the FIFO and is coupled therefrom to an OR gate 170, which is further controlled by the signal on lead 142 from the FIFO sync code detector, and provides an output coupled to the good/bad frame latch circuit 172 to provide the error frame signal on lead 174.

The details of the error corrector 34 are shown in the block diagram in FIG. 5. In this figure, the eight parallel outputs from the FIFO memory 128 of the error detection and time base corrector are shown coupled on leads 138 to a data word select switch 180 and to a parity storage latch 182. The switch 180 is in turn controlled by a timing signal on lead 184 from the play controller 36. This signal in turn controls the switch 180 such that the data words on the input leads 138 are coupled to a cyclically driven data word memory 186. The memory 186 preferably comprises a bank of random access memories (RAM) such as Type 2102 integrated circuit manufactured by N.E.C. The RAM 186 is in turn controlled by a read/write control signal on lead 188, which signal is provided from the AND and OR gates 190 and 192, respectively, in response to write-correction and write-data signals on leads 194 and 196, which signals are provided by the play controller 36.

The frame error signal on lead 174 which controls the overall error correction process is coupled to a frame status select switch comprising gates 198 and 200. This switch provides a signal on lead 202 to the frame good/bad memory circuit 204. The output of the memory 204 is then coupled to a frame status latch 206 to provide a RAM read/write control signal on lead 208. The signal on lead 208 is coupled back to the input of the AND gate 200 to further control the frame status switch and is also coupled to the AND gate 190 to control the production of the read/write correct signal on lead 188. As thus configured, the data word memory 186 is cyclically driven by the play controller via leads 210 such that the data words of successive frames are sequentially entered. These control signals further cause the data words of each frame to be successively outputed from the memory 186 as the data words of a next successive frame N+30 frames later in time are successively received. The outputed signals from the memory 186 are coupled to shift registers 212 and 214 to convert the parallel data into serial form. The registers are preferably integrated circuit types such as LS 165. The serial output signal is coupled through the AND gate 216 onto the output lead 218, whence the signal is fed to the digital to analog convertor 38 as shown in FIG. 1.

The output from the data word memory 186 is also coupled to a data storage latch 220, and in response to a data store signal from the play controller 36 on lead 222, couples the data words then present at the data word memory to a bank of exclusive OR gates 224. The parity store latch 182 is also controlled by signals on lead 226 from the play controller 36. As will be described in detail hereinafter, the foregoing portion of the error corrector circuit enables the correction of erroneous data words within a given frame.

In addition to such correction features, the error corrector 34 also includes circuits for muting the output in the event no correction is possible. That portion of the circuit includes a bad frame output mute 228 which is coupled to receive signals from the frame good/bad memory 204, and which is also controlled by input signals on lead 230 from the play controller 36. The output of the bad frame output mute 228 is coupled on lead 232 to the AND gate 216 where it is coupled together with the output from the shift registers 212 and 214. Thus if an uncorrectable frame is determined, the signal on lead 232 prevents the AND gate from passing the output from the shift registers and provides on output lead 218 a series of digital zeros.

. The operation of the error corrector 34 may generally be described as follows. Making an assumption that a given previous frame (N+1) has just been processed and the first data word of a new frame N is arriving into the error corrector, as the first data word of that frame N is received, the first 8 bit group, i.e., the most significant portion of that data word, is entered into the data word memory 186. The RAM memory 186 is then stepped forward and the next 8 bit group, consisting of the least significant portion of the first data word, is entered into the memory 186. The next data to be received on lead 138 is an 8 bit parity word originally generated from data words of frames N+15 and N+30. Since each frame contains only 8 parity words of information, it is readily appreciated that only half of the data words of frame N may be reconstructed from a combination of the parity words of one frame with data words of another frame. The received parity word is separated from the flow by the play controller 36, and is entered into the parity store latch 182. With the now received parity information of frame N and the data words of frame N+30 already stored in the RAM 186, it is now possible to correct half of the data words that are presently in the cyclical RAM memory 186 at position N+15, i.e., that frame which is 15 frames ahead in time of frame N.

The status of the data words of frame N+15 is outputed from the frame good/bad memory 204 into the frame status latch 206. If an indication is received that any of the data words of frame N+15 are bad, a correction signal is coupled on lead 208 through the gate 190 and 192 onto lead 188 into the memory 186 to allow corrected data words from the exclusive OR 224 to be inserted into the right place on the data word memory 186, thus deleting the erroneous data words at that position. If such an erroneous frame indication is received, once each parity word of frame N is stored in the parity latch 182, the play controller 36 provides a signal on lead 222 to enable the data storage latch 220 to access half of the data words of frame N+30 into the latch 220. The exclusive OR network 224 operates on the two and provides an output which will be the possible reconstruction of half of the data words of frame N+15.

The other half of frame N+15 is reconstructed when the 8 bit parity words of frame N-15 are received 15 frames later on, which parity words thus provide the additional information necessary to complete the reconstruction. At that time, each parity word of frame N-15 is successively stored in the parity storage latch 182 and the play controller 36 provides a signal on lead 222 to enable the data storage latch 220 to sequentially access half of the data words of frame N. The exclusive OR network 224 operates on these two groups of words and provides an output to the RAM 186 completing the reconstruction of the data words of frame N+15.

Each half of the above described operations thus continues on for the 16 data word portions of a given frame that arrives. Each respective data word is stripped off and entered into the cyclical RAM memory 186, while the successive parity words are stripped off and entered into the parity storage latch, where they are used to reconstruct, in succession, half of the data words at positions 1, 2, 3, 4, ... 16. At the end of the frame, the frame good/bad status of that frame in which the parity words may be used finally arrives, such that that information can then be used to determine whether or not the corrected information that has been entered into the memory 186 is actually a valid or good correction.

Subsequent to the correction of the first half of frame N+15, the frame good/bad memory 204 outputs the status of frame N+15 to the frame status latch 206. The output of latch 206, indicative of the status of frame N+15, is in turn summed with the good/bad status of frame N in the AND gate 200 as received on lead 174. The play controller 36 then controls the NOR gate 198 to couple the summed output of gate 200 to the frame good/bad memory 204. The summed signal is thus written in memory 204 as the new good/bad frame status of frame N+15. When the second half of frame N+15 is subsequently reconstructed from frames N and N-15 this sequence is repeated, such that the output of latch 206, which is now indicative of the status of N, is summed in gate 200 with an indication of frame N-15 to provide a completed summed signal to memory 204 indicative of the final good/bad status of frame N+15.

In the preferred embodiment described above, the condition for correcting data is that only two of the three frames that have been used were good, such that if the good/bad status of the frames from which the parity were constructed was good, and the alternate of either the frame N+15 or N+30 was good, then a corrected data word could be constructed and written into the memory 186 in the appropriate position of N+30 or N+15. In an analogous fashion, similar systems may also be constructed in which a three out of four or four out of five reconstruction techniques are utilized.

Since information is being retrieved from the record medium 23 at a higher rate than is needed to output it, due to the extra parity information inserted during the recording operation, the information is necessarily temporarily stored in the shift registers 212 and 214. When a complete data word is received into the shift registers, a serialized output is coupled to the AND gate 216. In combination with the final frame good/bad status on lead 232, that word is then outputed on the output lead 218.

The specific circuits provided in the play controller 36 are state of the art and are simply those required to provide the appropriate control signals as described to the respective other portions of the playback section 14. The controller 36 thus includes a crystal clock generator for providing a fixed clock pulse as well as appropriate counters, such as, for example, a 400 bit counter which may be preferably an integrated circuit type such as 74LS393. Other circuits for generating appropriate commands at other intervals throughout a given frame sequence are similarly constructed of conventional counters, registers and logic gates.

Having thus described the present invention, what is claimed is:

1. A circuit for processing audio signals to be digitized and recorded on a single track of a suitable record medium, said circuit comprising
   (a) means for converting an input analog audio signal into a corresponding digitized audio signal, and
   (b) means for encoding said digitized audio signal into a serialized signal suitable for recording on said record medium, said serialized signal containing a succession of frames in which each frame comprises a preselected number of data words, a preselected number of parity words, an error check code word corresponding to the frame and a sync word defining the frame location, said encoding means including means for generating the parity words of each frame by an exclusive OR combination of data words of at least two other preselected frames according to the expression $$P_K^N = D_{K+j}^{(N+n)} \oplus D_{K+k}^{(N+m)}$$

where
$P_K^N$ is a given parity word located at segment K of frame N,
$D_{K+j}^{(N+n)}$ is a given data word located at segment K+j of another preselected frame N+n, where j is an integer,
$D_{K+k}^{(N+m)}$ is a given data word located at segment K+k of yet another preselected frame N+m,
where K is an integer, k is an integer, and m and n are integers not equal to each other or to 0, whereby each frame which is incorrectly played back may be detected, correct data words of that frame may be reconstructed from the data words of at least one of said other preselected frames in combination with the parity words generated from the data words of that frame, and the corrected data words may be inserted into a serialized play-back signal in place of the data words of the incorrectly played back frame.

2. A circuit according to claim 1, wherein said encoding means includes means for generating each parity word $P_K^N$ from the exclusive OR combination of data words $D_{2K}^{N+n}$ and $D_{2K+k}^{N+m}$ such that N and M are sufficiently large integers that frames N+n and N+m are each spatially separated from frame N an interval of time to minimize the possibility that a single defect on a record medium onto which the encoded signals are recorded will cause a loss of signals upon play-back from both frame N and either frame N+n or frame N+m.

3. A circuit according to claim 2, wherein said parity word generating means includes means for generating each parity word $P_K^N$ from data words $D_K^{N+n}$ and $D_{2K+k}^{N+2n}$, whereby the parity words of frame N are generated from frames located n and 2n frames from frame N.

4. A circuit according to claim 2, wherein said parity word generating means includes means for generating the parity words at each spatial segment K of said frame N from the data words at a predetermined segment 2K of frame N+15 and from the data words at a predetermined spatial segment 2K+1 of frame N+30.

5. A circuit according to claim 1, further comprising a playback section including
   (a) means for providing a digital playback signal corresponding to recorded data on a said record medium,
   (b) means for processing said digital playback signal to determine the presence of erroneous signals within a frame including means for regenerating an error check code word corresponding to a received frame and means for comparing the regenerated error check word with a received error check code word of that frame to provide a frame error signal indicative of said erroneous signals in the absence of a match between the two,
   (c) means responsive to an output from said processing means for reconstructing a corrected data word and for inserting the corrected data words in place of the erroneous signals, including means for temporarily storing playback signals corresponding to each frame until signals corresponding to the preselected frames containing the parity and data words required for reconstruction of data words of said erroneous frame are received, means for reconstructing corrected data words from the received parity and data words within said preselected frames and means for inserting the reconstructed corrected data words in the proper spatial location within the processed digital playback signal, and
   (d) means for converting the processed and corrected digital playback signal into a corresponding analog output audio signal.

6. A circuit according to claim 1, wherein the encoding means includes means for formatting the digitized audio signal into successive frames, each of which consists of 400 bits including 16 sixteen bit data words, each of which is followed by an eight bit portion of a parity word, a twelve bit error check code word and a four bit sync word.

7. A circuit according to claim 1, wherein the encoding means includes means for providing a cyclical redundancy check to provide said error check code word.

8. A circuit according to claim 1, wherein said record medium comprises magnetic recording tape.

9. A circuit according to claim 1, further comprising means for generating timing signals coupled to said converting, encoding and parity word generating means to control the length of each frame and the relative positions of the various words within each frame.

10. A circuit according to claim 9, further adapted for storage and retrieval of additional signals in digital form on at least one additional track parallel to said single track, wherein like means are provided for encoding all signals in said succession of frames incuding parity words enabling error correction, and wherein said means for generating timing signals is adapted to provide common timing signals to circuits processing signals to be recorded on each of the parallel tracks, thereby enabling retrieval of related data from each of the tracks indepenent of the absolute placement of the recorded bits within each track on a said record medium.

11. A circuit according to claim 1, wherein said converting means includes means for periodically sampling said input audio signal to provide a corresponding digital output signal containing a succession of digitized words, each of which corresponds to each periodic sample, and wherein said circuit further includes a low pass filter for removing components of said input audio signal in excess of a given frequency to thereby limit the frequencies in said input signals to less than that of the sampling rate of said sampling means.

12. A circuit according to claim 1, wherein said encoding means includes means for converting a serial digitized audio signal from the input analog signal converting means into a parallel input digitized signal, a parallel input random access memory for receiving the parallel input digitized signal, means responsive to a delayed output from the memory of data words of said different preselected previous frames for generating and storing parity words corresponding to the data words within those frames, means for storing parallel output signals from the memory corresponding to data words, and means for combining the stored data words together with the parity words, the error check words and the sync words to provide a serialized digitized output audio signal, and bandwidth compression means for operating on the serialized output signal to provide a corresponding delay modulation code signal suitable for driving appropriate record transducers utilizing a minimum bandwidth.

13. A circuit according to claim 5, wherein the playback section includes means responsive to the digital playback signal for preamplifying and equalizing said signal.

14. A circuit according to claim 5, wherein the playback section further includes playback control and time generator means including a master clock generator for providing timing signals to synchronize associated portions of the playback section, thereby enabling the production of an audio output signal from the playback section in which the reproduced frequency components are substantially the same as those originally recorded.

15. A circuit according to claim 14, wherein the playback section further includes means responsive to the analog output signal from the digital playback signal converting means to remove all frequencies above a predetermined frequency to thereby ensure the formation of an audio signal having no supersonic frequency components present therein which could otherwise deleteriously affect further processing of the output audio signal.

16. A circuit according to claim 14, wherein the playback section further includes time base correction means including means for receiving a said digital playback signal which may be produced at a variable rate and timing signals from the playback control and time generator means for providing a delayed output data signal in which each bit occurs in exact synchronization with the timing signals, and servo means resonsive to a difference between a received frame sync pulse generated in response to the digital playback signal and an output frame sync pulse from the playback control and time generator means for phase locking a record medium drive means to ensure that the average period of the input frame sync pulses are the same as that of the output frame sync pulses, thereby removing "wow" and/or "flutter" components from the audio signal as may be due to said vibrations in the drive means.

17. A circuit according to claim 14, including means for playing back additional signals in digital form from at least one additional track parallel to said signal track, and including like means for providing a digital playback signal corresponding to the record data on each of said tracks, means for processing the digital playback signal from each of the tracks including means responsive to appropriate error signals for reconstructing a corrected frame and inserting the corrected frame in place of an erroneous frame in any of said tracks, and wherein said playback control and time generator means is adapted to provide common timing signals to circuits responsive to signals from each of said parallel tracks, thereby ensuring that signals fromeach of said tracks are processed through the error correction means and and the time generator means associated with each of said tracks at a single fixed rate, thereby enabling the multi-track processing with a single playback control and time generator means.

18. A circuit according to claim 5, wherein the frame reconstruction means of the playback section includes memory means synchronized to the play control and time generator means and responsive to the data words of each frame and to the error frame signals from the processing means for cyclically storing said data words and said frame error signals, error frame correction circuit means comprising data word latch means, parity latch means, and exclusive OR circuit means responsive to the status of the parity storage latch and the data storage latch to regenerate corrected data words in response to an error frame signal, wherein the corrected data words are coupled through the exclusive OR means and are reinserted into the memory means in place of the previously stored data words of the detected erroneous frames.

19. A circuit according to claim 18, wherein the frame reconstruction means further comprises means for responding to signals from the memory means to convert a parallel digital output signal therefrom into a serial digitized output signal and means for responding to an additional error signal indicative of the inability to correct an erroneous data word of a frame and for inserting in the serial output signal a train of successive digital zeros, thereby precluding the production of an erroneous analog signal when the process signal is coupled through the digital to analog converting means.

20. A recorder for storage and retrieval of audio frequency signals in digital form on a single track of a suitable record medium, said recorder comprising a record section and a playback section, wherein the record section includes (i) means for periodically sampling an input audio signal to provide a corresponding digital output signal containing a succession of digitized words, each of which corresponds to each periodic sample, (ii) means for encoding the digital output signal to provide a succession of frames, each successive frame containing a preselected number of said digitized words and another preselected number of parity code words generated from the data words in at least two predetermined spatial positions within different predetermined previous frames which are sufficiently spatially remote from the frame to minimize the probability of a loss of non-reconstructable data words corresponding to the given frame and the predetermined previous frames due to a common defect in a record medium on which the signals are to be recorded, a cyclical redundancy check code corresponding to the frame, and a synchronization code, (iii) a record control and time generator means for providing timing signals coupled to the audio signal converting means for enabling each sampling period and to the encoding means for controlling the length of each frame and the spatial location of each portion of each frame, and (iv) record means coupled to the encoding means for impressing upon said record medium a sensible alteration corresponding to the output of the encoding means and wherein the playback section includes (i) means for sensing alterations in a record medium and for providing a digital playback signal corresponding to the sensed alterations, (ii) preamplification means for amplifying and equalizing the playback signal to compensate for non-linearities in the recording medium and sensing means, and for converting the amplified and equalized signal into a delay modulation signal, (iii) synchronization means responsive to the delay modulation signal for sensing a synchronization portion thereof, including an oscillator means phase locked to the synchronization portion for regenerating periodic clock pulses corresponding to the duration of each bit of the delay modulation signal and frame sync pulses corresponding to the duration of each frame, and means for responding to the delay modulation signal and to the clock pulses and frame sync pulses to generate a standardized non-return to zero (NRZ) signal, (iv) playback control and time generator means including a master clock generator for providing timing signals to synchronize associated portions of the playback section, thereby enabling the production of an audio output signal from the playback section in which the reproduced frequency components are substantially the same as those originally recorded, (v) time base correction means including
  (i) means for receiving the standardized NRZ signal which may be produced at a variable rate and said timing signals from the playback control and time generator means for providing a delayed output data signal in which each bit occurs in exact synchronization with the timing signals,
  (ii) means for detecting an erroneous frame including means responsive to the received standardized NRZ signal for generating a cyclical redundancy check (CRC) signal corresponding to each frame, means for comparing the generated CRC signal with the received CRC portion of that frame and means for providing a frame error signal in the absence of a match between the two, and
  (iii) servo means responsive to a difference between received frame sync pulses generated by the synchronization means and an output frame sync pulse signal from the playback control and time generator means for phase locking a tape drive means to ensure that the average period of said input frame sync pulses is the same as that of the output frame sync pulses, (vi) frame reconstruction and error correction means responsive to the parity portion of the delayed output data signal and to the timing signals from the playback control and time generator means, including means for temporarily storing the delayed output data signal, means for checking the frame error signal corresponding to said preselected previous frames, means for reconstructing corrected data signals from received segments corresponding to the words in said at least two preselected spatial positions within different predetermined previous frames if the frame error check is indicative of a bad frame, and means for inserting the reconstructed signal in the proper spatial located within the temporarily stored signal, and (vii) digital to analog conversion means responsive to the error corrected data signal for converting the digital signal from the temporary storage means to a corresponding analog signal.

21. A system for correction of erroneous digital data to be serially recorded on a suitable record medium comprising (a) means for encoding an input digital signal into a succession of frames, preselected frame comprising a preselected number of data words and another preselected number of parity words, an error check code word corresponding to the frame and a sync word defining the frame location, said encoding means including means for generating the parity words of each frame from the data words in at least two predetermined spatial positions within different preselected frames, each of said different preselected frames being in turn selected to comprise data words spatially located different predetermined intervals of time from the data words of said given frame, said intervals of time being sufficiently long to provide a corresponding sufficient separation of said given frame from said different preselcted frames to minimize the possibliity that a single defect in a said record medium on which the digitized signal is to be recorded would cause a loss of signals corresponding to both said given frame and said different preselected frames, the parity words generated from the data words of said given frame in combination with the data words of at least one of said different preselected frames being sufficient to enable the reconstruction of corrected data words within a given frame, (b) means for processing a digital playback signal to determine the presence of erroneous signals within a frame including means for regenerating an error check code word corresponding to a received frame and means for comparing the regenerated error check word with a received error check code word of that frame to provide a frame error signal indictive of said erroneous signals in the absence of a match between the two, and (c) means responsive to a frame error signal for reconstructing a corrected data word and for inserting the corrected data words in place of the erroneous signals including means for temporarily storing playback signals corresponding to each frame until signals corresponding to the preselected frames containing the parity and data required for construction of data words of said erroneous frame are received, means for reconstructing corrected data words from the received parity and data words within said preselected frames and means for inserting the reconstructed corrected data words in the proper spatial location within the processed digital playback signal.

* * * * *